United States Patent [19]

Haefeli et al.

[11] 3,757,090

[45] Sept. 4, 1973

[54] MECHANICAL READING AND RECOGNITION OF INFORMATION DISPLAYED ON INFORMATION CARRIERS

[75] Inventors: Hans Rudolf Haefeli, Seengen; Tit Turnsek, Schaffhausen, both of Switzerland

[73] Assignee: Zellweger Ltd., Uster, Switzerland

[22] Filed: July 1, 1971

[21] Appl. No.: 158,696

[30] Foreign Application Priority Data

July 3, 1970 Switzerland ...................... 10089/70

[52] U.S. Cl. .................... 235/61.11 E, 235/61.12 N

[51] Int. Cl. ........................ G06k 7/10, G06k 19/06

[58] Field of Search .............. 235/61.11 D, 61.11 E; 250/219 R, 219 Q, 219 D; 340/146.3 R, 146.3 F, 174.1 H

[56] References Cited

UNITED STATES PATENTS

| | | | |
|---|---|---|---|
| 3,171,020 | 2/1965 | Lord | 235/61.11 C |
| 3,417,234 | 12/1968 | Sundblad | 235/61.11 E |
| 3,445,634 | 5/1969 | Lanes et al. | 235/61.11 E |
| 3,553,437 | 1/1971 | Boothroyd | 235/61.11 E |

*Primary Examiner*—Daryl W. Cook
*Attorney*—Kenyon & Kenyon Reilly Carr & Chapin

[57] ABSTRACT

The information carrier contains a code made up of a number of code signs including at least one recognition code sign. The information to be displayed is contained in a maximum of *n*-1 information code signs while a separating code between each two adjacent information code signs is of a value so that no more than *n* identical code signs can follow each other. The control and monitoring means are constructed to detect the succession of more than n identical code signs and separate out each possible code with more than n identical successive code signs.

20 Claims, 3 Drawing Figures

MECHANICAL READING AND RECOGNITION OF INFORMATION DISPLAYED ON INFORMATION CARRIERS

This invention relates to the mechanical reading and recognition of information displayed on information carriers with a reading and recognising arrangement which comprises means for storing mechanically read information displayed on information carriers in a code made up of code signs, more particularly of binary code signs, each of whose coding possibilities contains at least one recognition feature of code signs and both the accuracy of the code display on the information carriers, at least in the reading direction, and also the reading accuracy of the reading and recognising arrangement are known.

It is known that articles such as goods intended for sale, can be provided with special information carriers which carry coding possibilities of a certain code. For example, this code can contain details of price, weight, serial number, or location. Codes which have already been proposed include bar codes, perforation codes, ring codes or chessboard codes. Above all, however, binary signs and also color codes, for example, are commonly used as code signs.

The code signs are detected, i.e. read, by means of mechanical, optical, capacitive, magnetic or other reading units, certain forms of display for the code signs being used for the different types of reading units, for example perforations, printed bars, rings or other patterns, or magnetic bars. The code signs can either be visible or invisible to the human eye.

Most of the known code displays require mutual alignment of code pattern and reading unit for reading purposes. Methods of this kind are suitable in cases where for example, the information carriers or the articles provided with the information carriers all have the same geometric dimensions.

However, when information has to be read from differently shaped articles provided with code signs with one and the same reader, alignment of the articles presents considerable difficulties.

For this reason, it has also already been proposed to design the code signs in such a way that there is no need for the code signs to be oriented in the direction of travel of the article and/or in the reading direction of the reader.

U.S. Pat. No. 3,671,718 for example, describes a code display with code signs which together make up at least approximately a semicircle. Code displays of this kind are best read for example mechanically with the information carrier being carried through the reading zone of a reading unit on a conveyor.

The reading zone of the reading unit is in the form, of for example, a gap arranged transversely of the direction of travel through which a beam of light passes periodically in quick succession. Each article that passes through the reading zone reflects the scanning or probing light beam with a different intensity, depending upon its surface configuration. The intensity pattern of the reflected light is continuously recorded by means of an optical/electrical transducer. The signal sequence is delivered to a code recognition logic circuit which recognises each reflection signal sequence emanating from a code pattern and selects it for further processing. Selection is carried out, for example, on the basis of special recognition features contained in each possible code and/or on the basis of a preselected number of code signs, i.e. bits per possible code. In the case of the semicircular display system, the code is read when the beam of light passes at least approximately through the center of the code pattern. The beam of light then passes through a radius of the code pattern. When the space available for displaying the code pattern is restricted and where the beam of light travels at a high speed, the time available for reading the individual code signs or bits is inevitably short, and can be of the order of $10^{-7}$ secs.

U.S. Pat. No. 3,671,718, referred to above, describes an arrangement which is able to detect impulses sequences of a frequency of 2 Mc/s and higher.

The impulse sequence corresponding to the code signs, for example binary signs, is read in the rhythm of a timing pulse generator into a shift register, the timing pulse generator being re-synchronised at every (0–1) junction, cf. FIGS. 4, 4*a* of the above said patent.

Between each two (0–1)-junctions the timing pulse generator is free. This requires a high accuracy in the frequency of the timing pulse generator and a high level of constancy in the rate at which the beam of light is deflected over the period of time required for reading one possible code. The reading error of the reading unit should be kept as small as possible.

However, reading errors can even occur in reading units functioning with such precision as this because the code display itself is hampered by errors. Experience has shown that printed sectors of a circle for example vary in width.

The proposed method for mechanically reading and recognising information displayed on information carriers performs the function of largely eliminating reading errors of this kind without any need for the precision of the code display or for the reading accuracy of the reading unit to have to be increased.

A method according to the present invention is distinguished by the fact that the information to be displayed in a code of code signs is divided up into groups of at most $n-1$ immediately consecutive code signs and displayed in this form, by the fact that the sum of the absolute values of the greatest possible reading errors of the reading and recognising arrangement in the reading direction together with the sum of the absolute values of the errors, emanating from the code display for $n$ code signs is smaller than the dimension of one individual binary sign in the reading direction; by the fact that between each two adjacent information codes each containing at most $n-1$ code signs, there is arranged one separating code sign whose value is selected in such a way that no more than $n$ identical code signs ever follow one another in the overall display of each possible code, and by the fact that the information read by the reading units of the reading and recognising arrangement into the storage means is monitored by control or monitoring means which are designed and intended to detect the succession of more than $n$ identical code signs and to separate out each possible code with more than $n$ identical successive code signs.

The method according to the invention affords particular advantages in cases where the code signs of the code assume at least approximately the form of sectors of a circle of the same width and each possible code consists of a plurality of these code signs which together make up what is substantially a segment of a circle.

The information read by the reading units of the reading and recognising arrangement is advantageously delivered to a shift register in the ryhthm of a timing pulse generator. The monitoring means are connected alongside at least the first $(n+1)$-stages of the shift register. When equal values are stored in the first $n+1$ successive stages of the shift register, there is generated in the monitoring means a signal which is delivered to an erasing input of the shift register and effects erasure of all the shift register stages with the exception of the first shift register stage of the shift register.

An apparatus for carrying out the method of the invention comprises reading units for reading information displayed on information carriers in a code each of whose possible codes is built up of code signs conveying means which carry the information carriers past the reading units so that the information present on them can be read, means following the reading members for generating an electrical impulse sequence which corresponds to the code sign sequence read by the reading units; storage means to which the electrical impulse sequence is sequentially delivered, and monitoring means in front of or alongside the storage means which are designed and intended to recognise the succession of more than a predetermined number of identical impulses and hence code signs and to prevent them from being further processed.

Particularly suitable storage means are shift registers alongside which are connected monitoring means which generate an erasing signal when identical values are present in more than a predetermined number of successive register stages of the shift register.

The method and apparatus of the invention are suitable for identifying goods and for automatically and mechanically recognising the information and hence the goods.

It is possible in this way for adding and totalising to be automatically carried out at the cash desks of supermarkets. To this end, the particulars required for computation must be present in the possible codes. It can be sufficient for example for only the serial number of the article in question to be present in the code. In this case, the sole function of the reading and recognising arrangement is to detect the serial numbers of the various goods. In this case, computation is completed for example by the price of an article corresponding to a certain serial number being interrogated from a computer in which the prices belonging to the corresponding article numbers are stored, and used for further computation.

The flow of stock in supermarkets can be automatically checked continuously, in part at least, either simultaneously with computation or separately.

One example of the method according to the invention will now be explained with reference to the accompanying drawings showing one example of an apparatus for carrying out the method. In the drawings.

Figure 1:
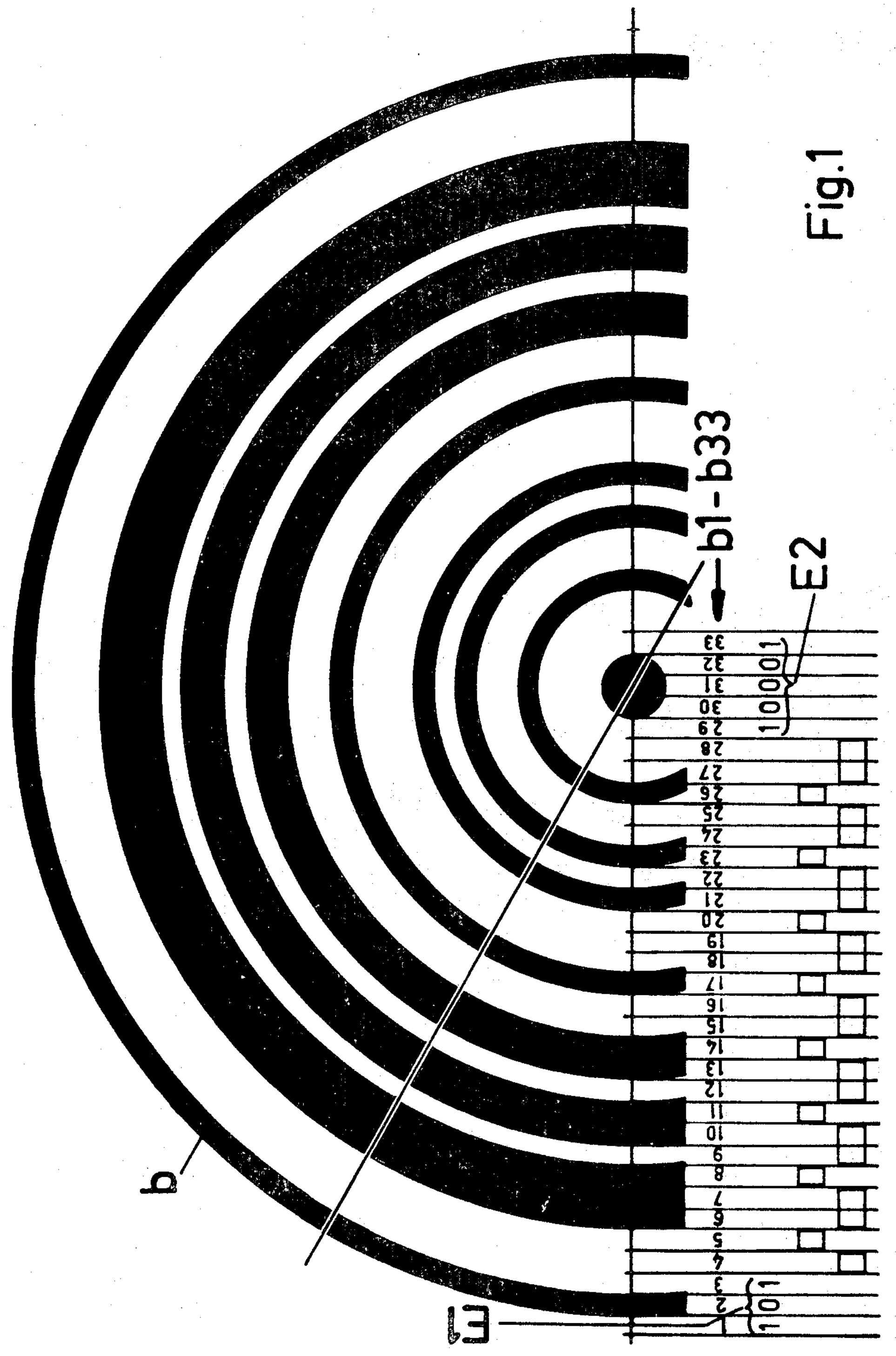
FIG. 1 shows one possible form of code display.

The code signs of the code display of FIG. 1 are in the form of concentrically arranged circular sectors $b$, so-called bits, which together make up what is substantially a sector of a circle, in our case a semicircle. The bits $b$ all have at least approximately the same width and are joined together without any gaps in between. In a binary code, for example with black and white or two differently coloured types of code signs, the succession of several identical code signs results in the formation of circular sectors differing in width. For example, the binary value 1 can be ascribed to the white sector $b$ and the binary value 0 to the black sector $b$.

The code display shown is suitable for reading in a reading and recognising apparatus of the kind described for example in the aforesaid Patent. All that is necessary is that the code display or an article provided with the code display be brought into the reading zone of the reading units, which can be done for example by means of a conveyor belt. The reading unit monitors the conveyor belt over its entire width in the reading zone preferably on a straight line running perpendicularly of the direction of travel. Monitoring can be carried out by a reading unit which travels through the reading zone in a sufficiently rapid sequence, for example with a dot-form or gap-form beam of light. It would also be possible, however, to provide a reading unit with which the reading zone is continuously monitored over its entire width. The substantially semicircular arrangement of the binary signs makes it unnecessary to align the code display and the conveying direction or reading zone of the reading unit.

During passage of the reading zone through the code display, a radius of the code display semicircle is detected for a certain period of time within which the code has to be recognised and read.

It is quite clear that where necessary a code sign can be divided into several sectors of a circle arranged relative to one another in such a way that when joined together by parallel transformations they form at least substantially a semicircle.

Wrappings of articles are usually printed and graphically distinguished by patterns and/or pictures. An optical reader has to be able for example to distinguish a code display or pattern from any patterns which also produce a signal in the reading units. Two recognition features $E_1$ and $E_2$ are present in the code display illustrated. The values of the peripheral bits $b_1$ to $b_3$ of the code display are fixed for all possible codes, for example 1, 0, 1. The bits $b29$ to $b33$ at the centre of each possible code are also fixed values, for example, 1,0,0,0,1. In this connection, it must be borne in mind that each pair of bits $b29$, $b33$ and $b30$, $b32$ are formed by the same sector which is allowable in view of the invariability of the recognition feature.

The reader is designed in such a way that it selects for further processing for example possible codes with the recognition features 101, also 10001 and 25 bits in between which contain the actual information.

The display, for example, printing of code patterns for optical readers is hampered by errors and is only possible with limited accuracy. The reading units have only a limited resolving power and a limited reading accuracy. The reader has to be able to recognise a large part at least of defective, damaged or illegally changed code displays.

In the example shown, this problem is solved by virtue of the fact that the actual information is divided into information codes made up of bit groups of one or two bits $[(n-2)$ or $(n-1)]$. Inserted between the information codes are separating codes made up of bits $b5$, $b8$, $b11$, $b14$, $b17$, $b20$, $b23$, $b26$, whose values are selected in such a way that no more than $n$ bits (in the example $n = 3$) with the same value ever occur in succession in one code display. In addition, the value of the separating code sign of at least one separating code is different from the value of at least one adjacent code sign of an information code, as illustrated.

Figure 2:
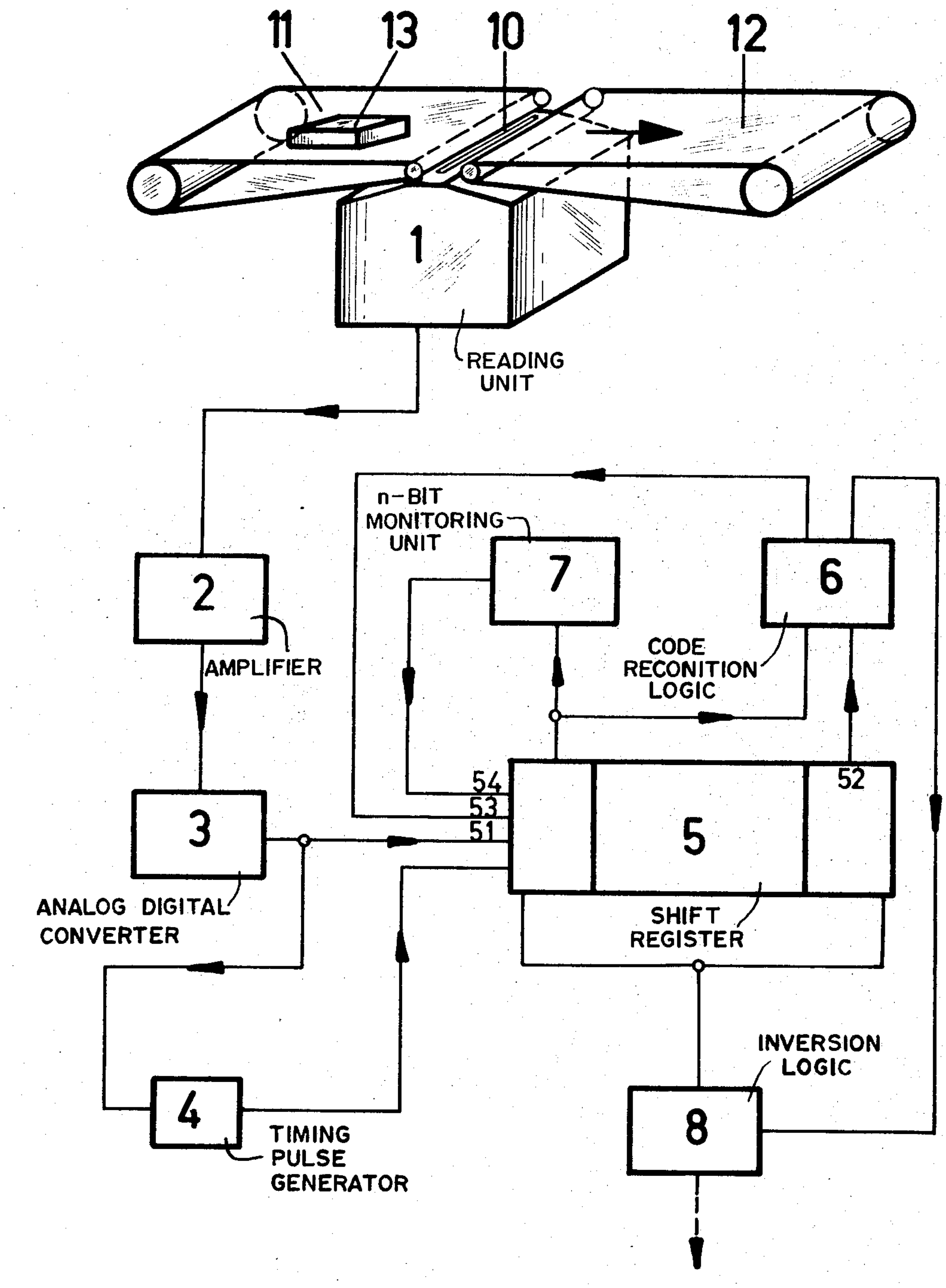
FIG. 2 shows the layout of an apparatus in the form of a block diagram.

FIG. 2 is a block diagram of an apparatus for reading and recognising code patterns of the kind shown in FIG. 1. In the gap between the two conveyor belts 11 and 12 of the conveyor arrangement there is situated the reading zone 10 through which a beam of light for example passes in rapid succession. When an article 13 moves into the reading zone 10, that part facing the reading unit 1, for example its end, which shows at least one code pattern, is scanned by the beam of light and an analogue signal corresponding to the intensity pattern is generated by the reflected light in an optical-electrical transducer of the reading unit 1, being delivered to and amplified in an amplifier 2.

An impulse sequence corresponding to the intensity pattern of the light is produced in the analogue-digital converter 3. In this impulse sequence, the succession of for example $x$ identical bits $b$ corresponds to an impulse of $x$ times the duration. The impulse sequence is read into the shift register 5 in the rhythm of the timing pulse generator 4. The timing pulse generator 4 can assume the form of an astable multivibrator which is resynchronised for example at every (1–0)-junction of the impulse sequence of the analogue-digital converter 3. This presupposes a substantially constant reading rate by the light beam and hence a constant bit succession frequency. The multivibrator frequency must correspond at least substantially to this bit succession frequency or to a multiple thereof. A circuit arrangement of this kind is described in detail in the aforesaid patent.

Accordingly, all the information taken in by the reading unit 1 is delivered in the form of standardised impulses to the shift register 5. The information to be read, i.e. the information corresponding to a code display is then sorted for further processing in the shift register 5. Due to the structure of the possible code, the following two criteria have to be satisfied;

1. The two recognition features 101 and 10001 must be present; and
2. Between the two recognition features there must be 25 bits of which no more than $n$ successive bits have the same value.

The recognition features are detected by the code recognition logic 6 which monitors the two parts 51, 52 with the first and last five stages of the shift register 5. In this case, it does not matter for example what direction the code is read in by the reading unit. When one of the two recognition features 101 or 10001 is simultaneously present in the two parts 51, 52, the information stored in the shift register 5 is transferred for example to a reversing stage such as an inversion logic 9 as in the above patent. If one of the two recognition features appears for example only in the input part 51 alone, an impulse is generated in the code recognition logic and delivered to the erasing input 53 so that all the stages of the shift register 5 are erased with the exception of the stages of the input part 51 of the shift register 5.

The input part 51 has additionally connected alongside it a second monitoring means in the form of a so-called $n$-bit monitoring unit 7 which in the event of more than $n$ identical bit values following one another also releases an erasing signal which is delivered to the erasing input 54 and which erases all the register stages of the shift register 5 with the exception of the first stage.

Figure 3:
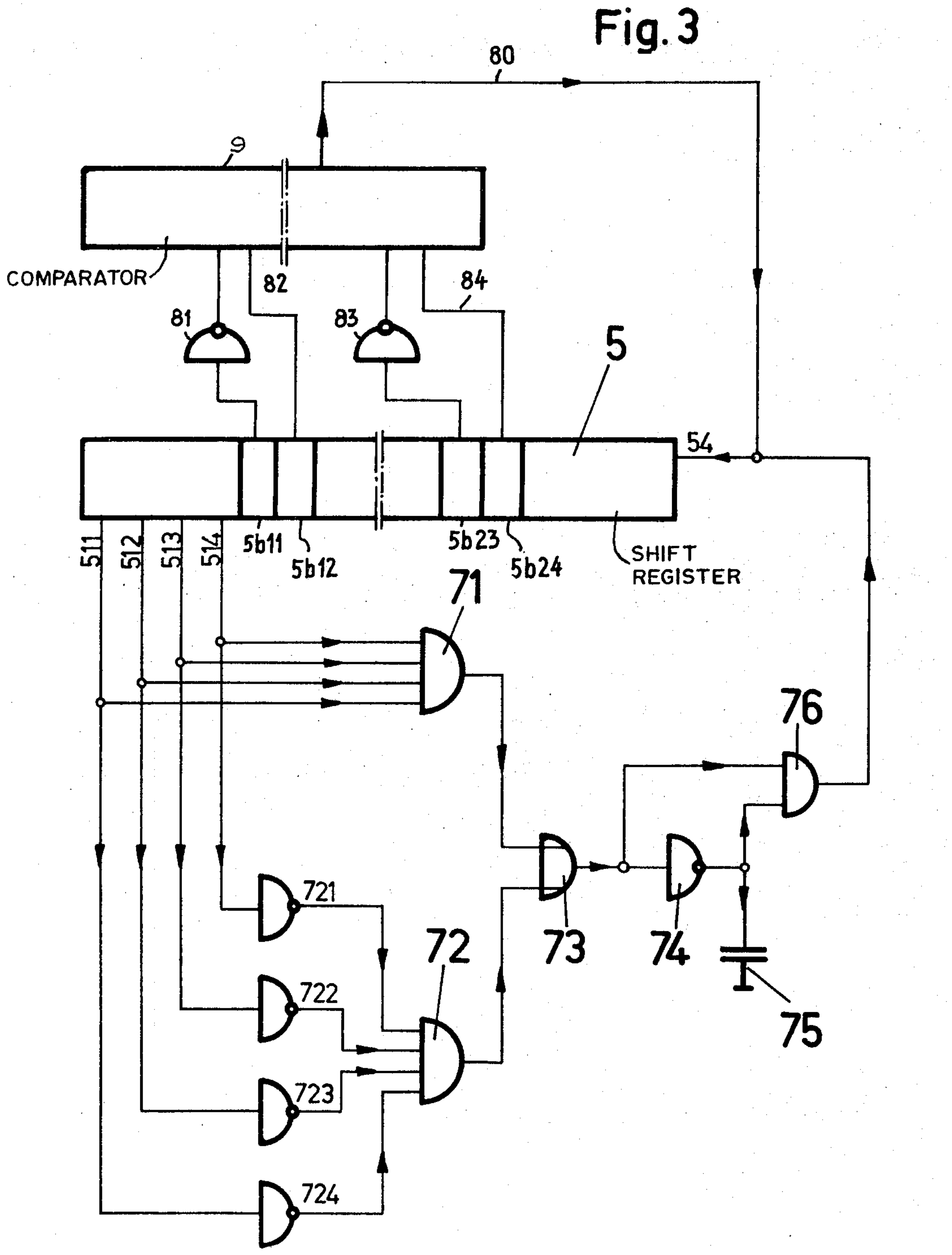
FIG. 3 is a logical circuit for recognising the succession of more than $n = 3$ identical code signs.

The logical circuit plan of an ($n$+1)-bit monitoring unit for $n = 3$ is shown in FIG. 3. The first four stages (generally $n$+1) 511, 512, 513, 514 are delivered to the AND gate 71 and parallel thereto through the inverters 721, 722, 723, 724 to the AND-gate 72. When four identical bit values 0 or 1 are present in the shift register stages 511, 512, 513, 514, an impulse is generated in the OR-gate 73. A standardised erasing impulse is produced from this impulse by means of the inverter 74 and the capacitor 75 in the AND-gate 76, and is delivered to the erasing input 54 of the shift register 5. Each erasing impulse at the erasing input 54 erases the entire shift register with the exception of the shift register stage 511.

In the embodiment shown, those stages of the shift register 5 in which the separating code signs ($b$5, $b$8, $b$11, $b$14 . . . .) are stored where one complete possible code is present in the shift register, and one adjacent shift register stage, for example, $b$4, $b$7, $b$10, $b$13, etc. or $b$6, $b$9, $b$12, $b$15, etc. are connected to a third monitoring means in the form of a comparator 9. Delivery of the separating code sign signal or of the signal from the adjacent code sign, in our case the separating code sign signal, takes place through an inverter 81, 83. The other of the two signals is delivered via lines 82, 84 non-inverted to the comparator 9. Accordingly, the same signal 0 or 1 has to appear in the corresponding comparator stages of the code sign/separating code sign pairs (for example $b$4, $b$5). If this is not the case for one or more of these pairs, a fault signal or error signal is produced in the comparator 9 and is, being delivered through the line 80 to the erasing input 54 of the shift register 5. In the example shown, each erasing impulse in the erasing input 54 erases the entire shift register with the exception of the first shift register stage 511, thus excluding from further processing the stored possible code recognised to be false.

The different erasing signals can also be fed to an arrangement which separates information carriers containing a possible code recognised as false by the reading and recognising arrangement. The arrangement can also be such that information carriers of this kind are delivered to the reader a second time.

What we claim is:

1. In a method of reading and recognizing code patterns having a plurality of code signs therein forming a plurality of information codes and separating codes with said codes consisting of no more than $n$ identical code signs, the steps of receiving an impulse sequence corresponding to a read code pattern within a storage means;

monitoring said impulse sequence to detect a succession of more than $n$ identical code signs within said read code pattern; and erasing said impulse sequence from the storage means in response to the detection of a succession of more than $n$ identical code signs within said read code pattern.

2. In a method as set forth in claim 1 wherein $n$ equals three (3).

3. In a method as set forth in claim 1 wherein said information codes each have at most $n - 1$ immediately consecutive code signs for containing information to be displayed, and said separating codes each have at most n identical immediately consecutive code signs, each said separating code being disposed between two adjacent information codes.

4. In a method as set forth in claim 1 wherein said code pattern includes two recognition features at the ends thereof and which further comprises the steps of monitoring said impulse sequence to detect an absence of at least one of said recognition features therefrom and of erasing said impulse sequence from the storage means in response to the detection of the absence of said one recognition feature in said read code pattern.

5. In a method as set forth in claim 1 wherein said impulse sequence is received in a timing pulse rhythm within the storage means.

6. In a method as set forth in claim 1 wherein at least the first $n + 1$ code sign positions of said impulse pattern are monitored in said step of monitoring to detect a succession of $n + 1$ identical values for erasing said impulse pattern from said storage means.

7. In a method as set forth in claim 1 wherein the value of a separating code sign of at least one separating code is different from the value of at least one adjacent code sign of an information code, the further steps of monitoring said impulse pattern to detect the absence of a difference between said separating code sign and said adjacent information code sign and of erasing said impulse pattern from the storage means in response to the detection of the absence of a said difference.

8. In a method as set forth in claim 7 wherein said adjacent information code sign is a preceding code sign relative to said separating code sign.

9. In a method as set forth in claim 7 wherein said adjacent information code sign is a following code sign relative to said separating code sign.

10. Apparatus for reading and recognizing code patterns having a plurality of code signs forming a plurality of information codes and separating codes with said codes consisting of no more than n identical code signs, comprising means for reading a code pattern and for producing an electrical impulse sequence corresponding to said code pattern;

a storage means for receiving said impulse sequence; and monitoring means connected to said storage means for monitoring said received impulse pattern to detect a succession of more than n identical code signs with said read code pattern and for emitting a signal to said storage means in response to the detection of a succession of more than n identical code signs within said read code pattern to erase said impulse sequence from said storage means.

11. Apparatus as set forth in claim 10 wherein said storage means is a shift register having a plurality of stages to receive said impulse sequence and an erasing input connected to said monitoring means and wherein said monitoring means emits said signal to said erasing input in response to the storage of identical values in a succession of more than n stages of said register.

12. Apparatus as set forth in claim 11 wherein said erasing input is connected to all of said stages except the first stage.

13. Apparatus as set forth in claim 10 wherein said code pattern includes two recognition features at the ends thereof and which further comprises a second monitoring means connected to said storage means for monitoring said received impulse pattern to detect an absence of at least one of said recognition features therefrom and for emitting a signal to said storage means in response to a said absence to erase said impulse sequence from said storage means.

14. Apparatus as set forth in claim 13 wherein said second monitoring means is a code recognition logic.

15. Apparatus as set forth in claim 13 wherein said monitoring means is an n-bit monitoring unit connected to said storage means to monitor the first $n + 1$ code signs received in said storage means to detect a succession of $n + 1$ identical values for erasing said impulse pattern from said storage means.

16. Apparatus as set forth in claim 10 wherein the value of a separating code sign of at least one separating code is different from the value of at least one adjacent code sign of an information code, further comprising a third monitoring means connected to said storage means for monitoring said received impulse pattern to detect the absence of a difference between said separating code sign and said adjacent information code sign and for emitting a signal to said storage means in response to a said absence to erase said impulse pattern from said storage means.

17. Apparatus as set forth in claim 16 wherein said third monitoring means is a comparator.

18. Apparatus for reading and recognizing code patterns having a plurality of code signs forming a plurality of information codes and separating codes and a pair of recognition codes at the ends of a said pattern, said information codes and said separating codes consisting of no more than n identical code signs, comprising means for reading a code pattern and for producing an electrical impulse sequence corresponding to said code pattern;

a storage means for receiving said impulse sequence;

a first monitoring means connected to said storage means for monitoring said received impulse pattern to detect a succession of more than n identical code signs within said read code pattern and for emitting a first signal to said storage means in response to the detection of a succession of more than n identical code signs within said read code pattern to erase said impulse sequence from said storage means; and a second monitoring means connected to said storage means for monitoring said received impulse pattern to detect an absence of at least one of said recognition features therefrom and for emitting a second signal to said storage means in response to a said absence to erase said impulse sequence from said storage means.

19. Apparatus as set forth in claim 18 wherein the value of a separating code sign of at least one separating code is different from the value of at least one adjacent code sign of an information code, further comprising a third monitoring means connected to said storage means for monitoring said received impulse pattern to detect the absence of a difference between said separating code sign and said adjacent information code sign and for emitting a signal to said storage means in response to a said absence to erase said impulse pattern from said storage means.

20. Apparatus as set forth in claim 19 wherein said storage means is a shift register, said first monitoring means is an n-bit monitoring unit, said second monitoring means is a code recognition logic and said third monitoring means is a comparator.

* * * * *